United States Patent
Conn

(10) Patent No.: US 6,857,897 B2
(45) Date of Patent: Feb. 22, 2005

(54) REMOTE CABLE ASSIST

(75) Inventor: Kevin D. Conn, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 10/425,409

(22) Filed: Apr. 29, 2003

(65) Prior Publication Data

US 2004/0219824 A1 Nov. 4, 2004

(51) Int. Cl.$^7$ ................................. G08B 5/22
(52) U.S. Cl. ..................... 439/490; 340/825.49
(58) Field of Search ................ 439/488, 490, 439/491; 340/656, 825.49, 310.08

(56) References Cited

U.S. PATENT DOCUMENTS

| | | | | |
|---|---|---|---|---|
| 3,440,347 A | * | 4/1969 | Spencer et al. | 367/197 |
| 4,365,238 A | * | 12/1982 | Kollin | 340/521 |
| 5,095,277 A | * | 3/1992 | Cerda | 234/539 |
| 5,493,618 A | * | 2/1996 | Stevens et al. | 381/110 |
| 5,910,776 A | * | 6/1999 | Black | 340/10.1 |
| 6,445,087 B1 | * | 9/2002 | Wang et al. | 307/40 |
| 6,688,910 B1 | * | 2/2004 | Macauley | 439/491 |
| 6,759,966 B1 | * | 7/2004 | Weng | 340/825.69 |

* cited by examiner

Primary Examiner—Neil Abrams

(57) ABSTRACT

A communication cable comprising a trigger and a wireless transmitter coupled to the trigger and adapted to transmit a wireless transmitter coupled to the trigger and adapted to transmit a wireless signal to activate a user identifiable locator adjacent a cable connector disposed on a device. A processor-based system a cable connector, a user identifiable locator disposed adjacent the cable connector, and a controller coupled to the user identifiable locator and triggerable wirelessly to facilitate guided connection between the cable connector and a communication cable.

29 Claims, 4 Drawing Sheets

REMOTE CABLE ASSIST

BACKGROUND OF THE INVENTION

Electronic devices, such as computer components and peripherals, are often coupled together via a communication cable. For example, a printer may be coupled to a laptop or desktop computer via a parallel cable. In certain applications, the location of the proper receptacle for the communication cable may be uncertain or difficult to identify. For example, a user may have difficulty connecting the communication cable to the proper receptacle if it is located in a dark area, a tight space, or another area having limited accessibility or visibility. The foregoing connection difficulties are generally worse in applications having multiple receptacles for communication cables. For example, a computer system may have one or more parallel ports, serial ports, Universal Serial Bus (USB) ports, Institute of Electrical and Electronics Engineers (IEEE)—1394 ports, network ports, modem ports, and so forth. Accordingly, a user may be unable to locate the appropriate port for the desired communication cable.

BRIEF DESCRIPTION OF THE DRAWINGS

Embodiments will hereafter be described with reference to the accompanying drawings, wherein like reference numerals denote like elements, and.

DETAILED DESCRIPTION

Figure 1:
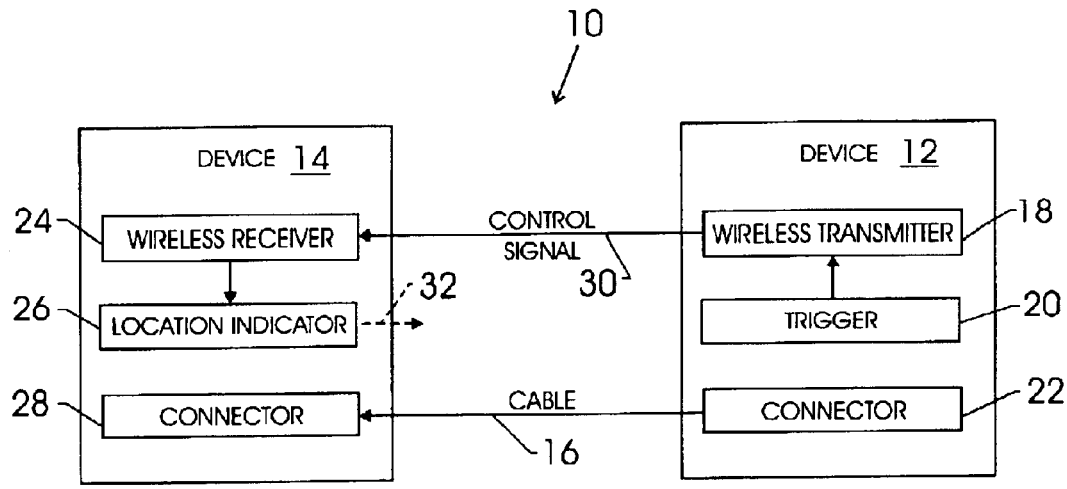
FIG. 1 is a block diagram illustrating a locator-assisted connection system in accordance with certain embodiments of the present invention.

FIG. 1 is a block diagram of a system 10 in accordance with certain embodiments of the present invention. As illustrated, the system 10 comprises devices 12 and 14 communicatively coupled together via a cable 16. As discussed in further detail below, the devices 12 and 14 may comprise a wide variety of electronics, computer components and peripherals, network devices, and so forth. For example, the devices 12 and 14 may comprise electronic devices disposed in separate locations, such as in a network. Accordingly, the system 10 may comprise a computer system, a network, or any other connectable system of devices.

As illustrated, the device 12 comprises a wireless transmitter 18, a trigger 20, and a connector 22, while the device 14 comprises a wireless receiver 24, a location indicator 26, and a connector 28. The wireless transmitter 18 and the wireless receiver 24 may comprise radio frequency (RF) circuitry, infrared or other optical communication circuitry, blue tooth technology, or other suitable wireless communication circuitry. The trigger 20 may comprise a button, a switch, an event activated trigger, a voice activated trigger, a software activated trigger, a hardware activated trigger, or other suitable user interactive or automatic triggers. The location indicator 26 may comprise a light such as a light emitting diode (LED), a vibration mechanism, an audio device, or other indicators that may be identified by one of the user's senses. The location indicator 26 also may comprise a variety of different light colors (e.g., red, blue, green, etc.), vibrational signals, audio tones or signals, and so forth. The connectors 22 and 28 may comprise parallel port connectors, serial port connectors, Universal Serial Bus (USB) connectors, Institute of Electrical and Electronics Engineers (IEEE)—1394 connectors, network connectors, modem connectors, and so forth. Accordingly, the cable 16 has end connectors configured to interface the particular interface format of the connectors 22 and 28. As discussed in further detail below, the wireless transmitter 18 and the trigger 20 may be disposed within the device 12, within the cable 16 (e.g., in one of the end connectors), within a module connectable with both the cable and one of the connectors 22 and 28, or in other configurations. It also should be noted that the device 14 may comprise one or more additional connectors, wherein the location indicator 26 is disposed adjacent a connector 28.

In operation, the location indicator 26 identifies the location of the connector 28 for proper connection of the devices 12 and 14 via the cable 16. In the illustrated embodiment, the wireless transmitter 18 transmits a control signal 30 to the wireless receiver 24 in response to engagement of the trigger 20. For example, a user may engage the trigger 20 at the device 12, at an end connector of the cable 16, at a software interface, or at another location/interface. The control signal 30 may comprise a variety of wireless signals or data, such as an on/off control, a device identifier, a connector identifier, a cable-type identifier, or other such data. In response to the control signal 30 received by the wireless receiver 24, the location indicator 26 activates a signal 32, such as a light or other user-identifiable signal. The user then locates the connector 28 corresponding to the signal 32 and communicatively couples the cable 16 with the connector 28. Accordingly, the location indicator 26 assists a user in connecting the cable 16 to the correct connector 28 regardless of the user's knowledge of connector types, devices, or other system information.

Figure 2:
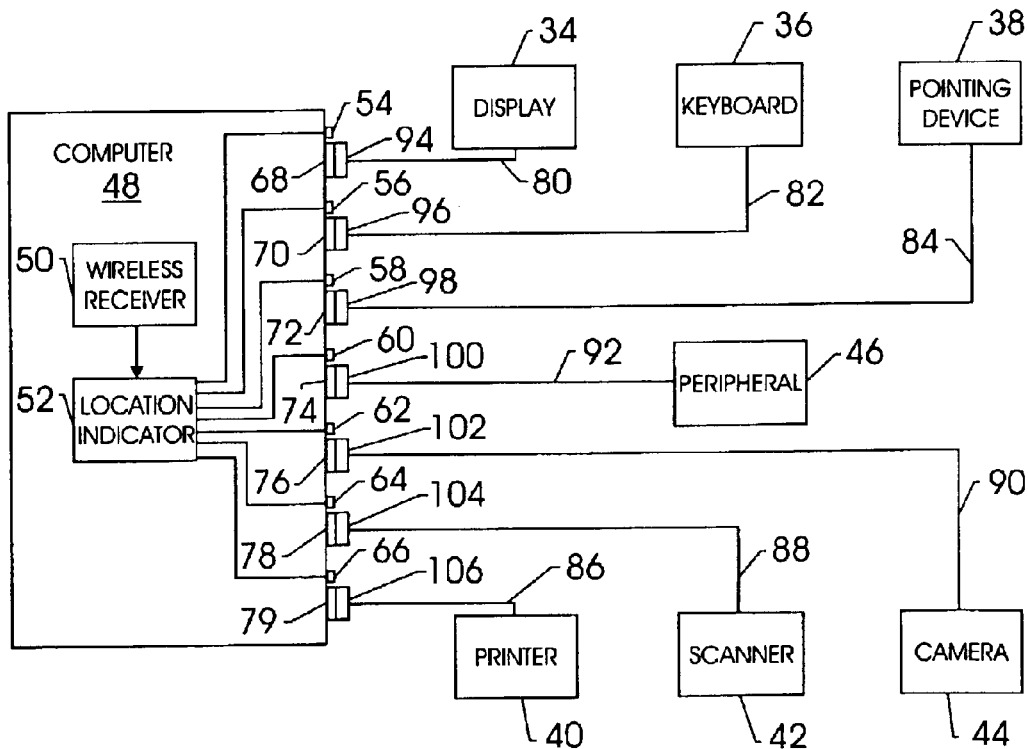
FIG. 2 is a block diagram illustrating an alternative embodiment of the system having a plurality of peripherals coupled to a computer.

FIG. 2 is a block diagram illustrating an alternative embodiment of the system 10 having a plurality of peripheral devices 34, 36, 38, 40, 42, 44, and 46 communicatively coupled to a computer 48. The illustrated peripheral devices 34, 36, 38, 40, 42, 44, and 46 comprise a display, a keyboard, a pointing device (e.g., a mouse, a touch pad, a joystick, a digitizer pad/pen, etc.), a printer, a scanner, a camera, and a peripheral, respectively. However, other input, output, and user-interactive devices may be connected with the system 10. The computer 48 may comprise a desktop computer, a laptop computer, a palmtop computer, a notepad computer, a rack mount computer system, a server, or another type of computing device.

As illustrated in FIG. 2, the computer 48 comprises a wireless receiver 50, a controller or location indicator 52 communicative with the wireless receiver 50, and a plurality of locator lights or light emitting diodes (LEDS) 54, 56, 58, 60, 62, 64, and 66 communicative with the location indicator 52. Each of the locator lights 54, 56, 58, 60, 62, 64, and 66 is disposed adjacent a particular communication connector, such as connectors 68, 70, 72, 74, 76, 78, and 79, respectively. Although not illustrated, the system 10 of FIG. 2 also comprises a wireless transmitter and trigger, similar to those described with reference to FIG. 1. Accordingly, during connection of each of the peripheral devices 34, 36, 38, 40, 42, 44, and 46 with the computer 48, the wireless transmitter communicates a control signal to the wireless receiver 50, thereby activating the location indicator 52 to illuminate one of the locator lights 54, 56, 58, 60, 62, 64, and 66 associated with the correct one of the connectors 68, 70, 72, 74, 76, 78, and 79, respectively. By way of this locator-assisted process, each one of the peripheral devices 34, 36, 38, 40, 42, 44, and 46 may be communicatively coupled to the appropriate connectors 68, 70, 72, 74, 76, 78, and 79 via cables 80, 82, 84, 86, 88, 90, 92, and 94, respectively. As discussed above, the wireless transmitter and trigger maybe incorporated into the peripheral devices 34, 36, 38, 40, 42, 44, and 46 or the cables 80, 82, 84, 86, 88, 90, 92, and 94. For example, the wireless transmitter and trigger may be incorporated into the cables 80, 82, 84, 86, 88, 90, and 92 at end plugs 94, 96, 98, 100, 102, 104, and 106, respectively.

Figure 3:
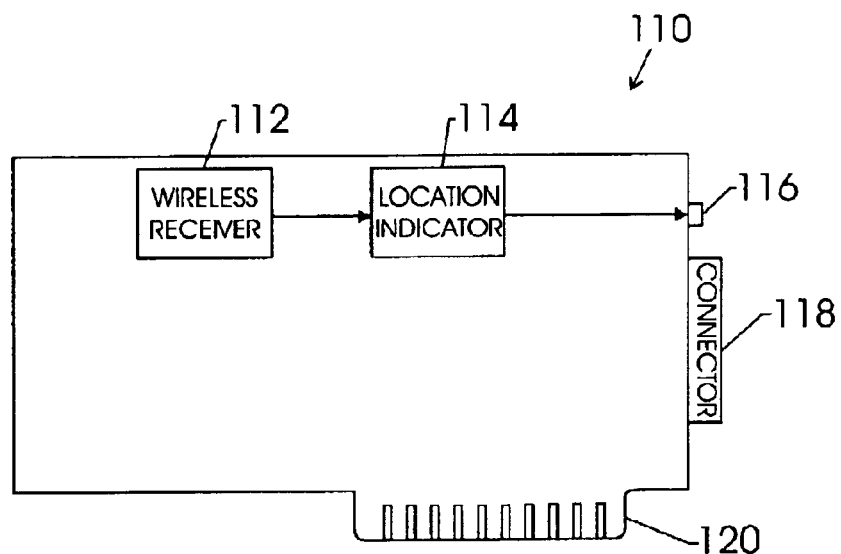
FIG. 3 is a side view illustrating a component having a wireless receiver, a location indicator, and a locator light disposed adjacent a connector in accordance with certain embodiments of the present invention.

FIG. 3 is a side view of a component 110 having a wireless receiver 112, a location indicator 114, and a user identifiable locator or light 116 in accordance with another embodiment of the present invention. As illustrated, the user identifiable locator or light 116 is disposed adjacent a connector 118, which is communicatively coupled with circuitry (not shown) and a connector 120 on the component 110. For example, the component 110 may comprise a variety of circuit boards or card-based computer components, such as a network card, a modem, a video card, an audio card, a security card, a network management card, a wireless communication card, and cards having other desired functions. Moreover, the component 110 may be adapted for a desktop computer, a laptop computer, a rack mount computer system, or other desired computer systems. Accordingly, the component 10 and the connector 120 may comprise a variety of communication buses and interfaces, such as Integrated Drive Electronics (IDE), Enhanced Integrated Drive Electronics (EIDE), Peripheral Component Interconnect (PCI), Advanced Technology Attachment (ATA), Universal Serial Bus (USB), Institute of Electrical and Electronics Engineers (IEEE)—1394, Small Computer System Interface (SCSI), and other desired interfaces and buses.

In operation, a wireless transmitter sends a control signal to the wireless receiver 112, which activates the location indicator 114 to enable the user identifiable locator 116, e.g., light. A user is then able to locate the connector 118 disposed adjacent the user identifiable locator 116, thereby facilitating a connection between the component 110 and a separate device. For example, a computer system having a plurality of peripherals and components, such as the component 110, may be set up more easily by the foregoing connector location technique. By way of this locator-assisted connection process, even a non-technical user or consumer may set up a computer system without knowledge of the components, the cable types, the connector types, and so forth.

Figure 4:
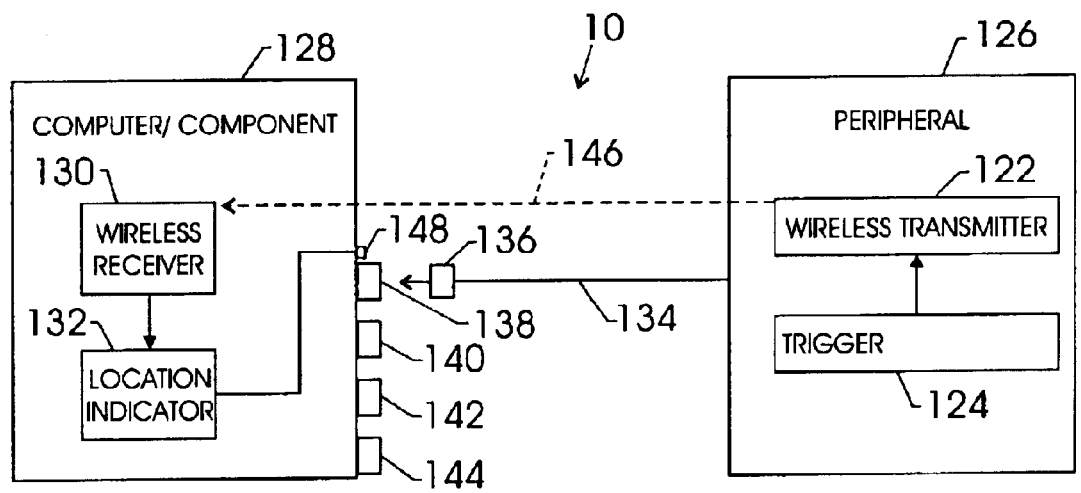
FIG. 4 is a block diagram illustrating an alternative embodiment of the locator-assisted connection system having a wireless transmitter and a trigger disposed within a peripheral.

As discussed above, the wireless transmitter and trigger may be disposed in a variety of locations and devices. FIG. 4 is a block diagram illustrating an alternative embodiment of the system 10. As illustrated, the system 10 comprises a wireless transmitter 122 and a trigger 124 disposed in a peripheral 126, while a computer/component 128 has a wireless receiver 130 and a controller or location indicator 132. The peripheral 126 also comprises a communication cable 134 having an end connector 136 for communicatively coupling the peripheral 126 to the computer/component 128. However, the computer/component 128 may comprise a plurality of connectors, such as connectors 138, 140, 142, and 144, one of which is the proper connector for the peripheral 126 and the end connector 136.

In operation, the trigger 124 may be engaged for wirelessly transmitting a control signal 146 from the wireless transmitter 122 to the wireless receiver 130, which then communicates the control signal 146 (or an appropriate command) to the location indicator 132. In response to the control signal 146, the location indicator 132 activates a user identifiable locator or light 148 adjacent the connector 138, which is the proper connector for the peripheral 128 and the end connector 136. By way of this locator-assisted connection process, the proper connection is ensured between the computer/component 128 and each desired peripheral, such as the peripheral 126. Accordingly, the computer/component 128 also may comprise a user identifiable locator or light, such as 148, adjacent each one of the connectors 138, 140, 142, and 144. If multiple user identifiable locators or lights are employed in the computer/component 128, the control signal 146 may comprise a variety of data or signals to identify the particular peripheral, bus type, connector, or user identifiable locator or light associated with the desired connection. For example, data may be acquired from the peripheral 126 for properly configuring the control signal 146. The system then identifies and activates the appropriate one of the user identifiable locators or lights adjacent the proper one of the connectors 138, 140, 142, and 144.

Figure 5:
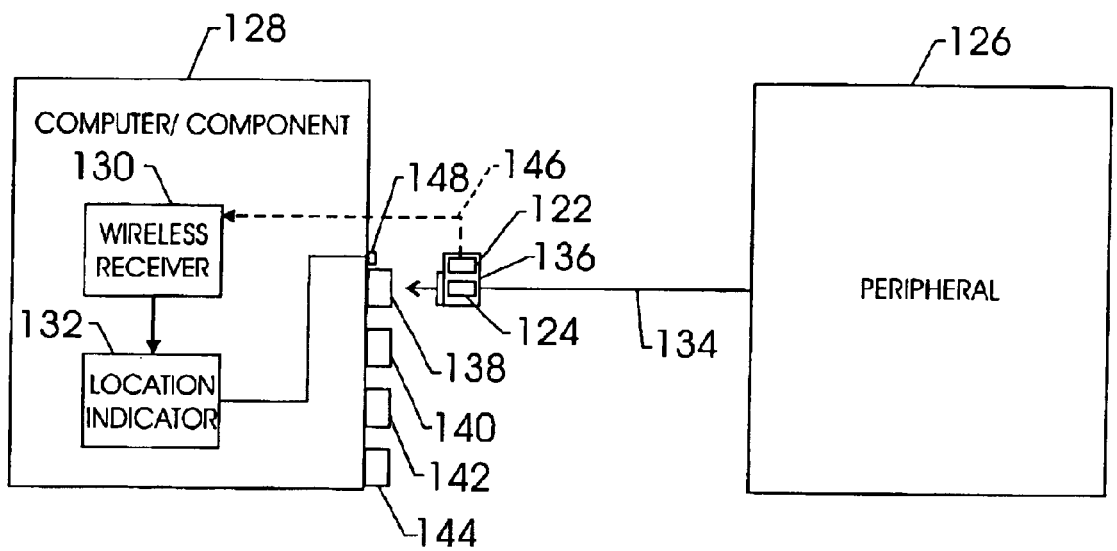
FIG. 5 is a block diagram illustrating an alternative embodiment of the locator-assisted connection system having the wireless transmitter and the trigger disposed within a cable.

FIG. 5 is a block diagram illustrating an alternative embodiment of the system 10 illustrated in FIG. 4. In the illustrated embodiment, the wireless transmitter 122 and the trigger 124 are disposed in the end connector 136 of the cable 134, rather than the peripheral 126. Accordingly, the cable 134 itself acts as the source of the control signal 146 to the wireless receiver 130. In operation, a user may engage the trigger 124 while searching for the proper one of the connectors 138, 140, 142, and 144 on the computer/component 128. In response to the trigger 124, the wireless transmitter 122 sends the control signal 146 from the end connector 136 to the wireless receiver 130, which then communicates the control signal 146 to the location indicator 132. The location indicator 132 then activates the user identifiable locator or light 148 adjacent the connector 138, thereby guiding the user to connect the end connector 136 to the connector 138.

Figure 6:
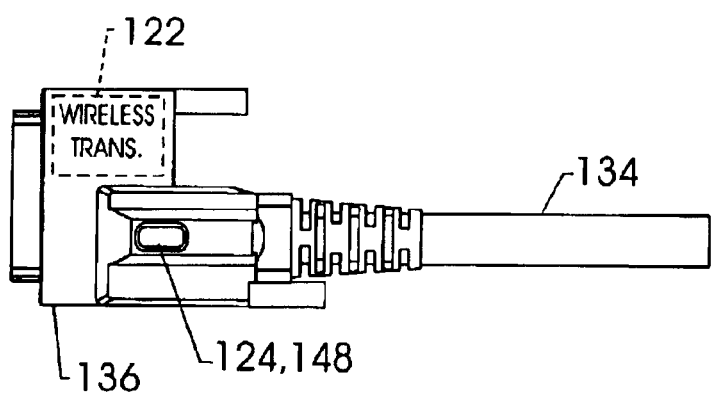
FIG. 6 is a side view illustrating an embodiment of the cable having the wireless transmitter and the trigger disposed within an end connector.
Figure 7:
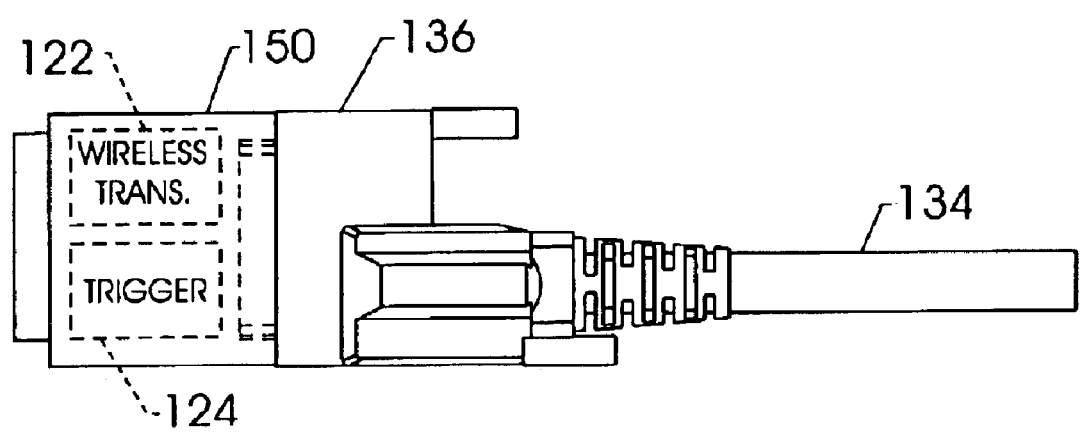
FIG. 7 is a side view illustrating a connector module having the wireless transmitter and the trigger in accordance with certain embodiments of the present invention.

FIG. 6 is a side view illustrating an embodiment of the cable 134 illustrated in FIGS. 4 and 5. As illustrated, the wireless transmitter 122 is disposed within the end connector 136, while the trigger 124 comprises a button 148 communicatively coupled to the wireless transmitter 122. Alternatively, the wireless transmitter 122 and the trigger 124 may be disposed within a connector module 150, as illustrated by FIG. 7. In this alternative embodiment, the connector module 150 may be coupled to the end connector 136 as illustrated, or the connector module 150 may be coupled to a peripheral such as peripheral 126. In operation, the connector module 150 itself acts as the source of the control signal to the wireless receiver. Upon activation of the appropriate user identifiable locator, the desired cable connection can be completed.

What is claimed is:

1. A communication cable, comprising:
   a trigger; and
   a wireless transmitter coupled to the trigger and adapted to transmit a wireless signal to activate a user identifiable locator adjacent a cable connector disposed on a device.

2. The communication cable of claim 1, wherein the trigger comprises a button.

3. The communication cable of claim 1, wherein the trigger is disposed on an end connector of the communication cable.

4. The communication cable of claim 1, wherein the wireless transmitter is disposed in an end connector of the communication cable.

5. The communication cable of claim 1, wherein the wireless transmitter comprises a radio frequency transmitter.

6. The communication cable of claim 1, wherein the wireless transmitter comprises an optical transmitter.

7. The communication cable of claim 1, wherein the communication cable comprises a computer cable.

8. A processor-based system, comprising:
   a cable connector;
   a user identifiable locator disposed adjacent the cable connector;
   a communication cable having a trigger, wherein the trigger is adapted to activate a wireless transmitter to transmit a control signal; and
   a controller coupled to the user identifiable locator and configured to activate the user identifiable locator in response to the control signal to facilitate locating the cable connector and guiding connection between the cable connector and the communication cable.

9. The processor-based system of claim 8, wherein the user identifiable locator comprises a light.

10. The processor-based system of claim 8, wherein the controller comprises a wireless receiver responsive to the control signal from the wireless transmitter.

11. The processor-based system of claim 8, wherein the cable connector and the user identifiable locator are disposed on a communication panel having a plurality of different cable connectors.

12. The processor-based system of claim 8, wherein the cable connector, the user identifiable locator, and the controller are disposed in a computer.

13. The processor-based system of claim 12, wherein the computer comprises a desktop computer.

14. The processor-based system of claim 12, wherein the computer comprises a laptop computer.

15. The processor-based system of claim 12, wherein the computer comprises a notepad computer.

16. The processor-based system of claim 12, wherein the computer comprises a rack mount computer system.

17. The processor-based system of claim 8, wherein the cable connector and the user identifiable locator are disposed on a computer component.

18. The processor-based system of claim 17, wherein the computer component comprises a card-based device.

19. The processor-based system of claim 8, wherein the communication cable comprises the wireless transmitter.

20. The processor-based system of claim 8, comprising a peripheral device coupled to the communication cable.

21. A system, comprising:
   means for wirelessly communicating a control signal;
   means for triggering the means for wirelessly communicating, wherein the means for triggering is disposed on a communication cable; and
   means for signaling a location of a communication connector in response to the control signal.

22. The system of claim 21, wherein the means for wirelessly communicating a control signal comprises a wireless transmitter and a wireless receiver associated with the communication cable and the communication connector, respectively.

23. The system of claim 21, wherein the means for signaling comprises a locator light disposed adjacent the communication connector.

24. The system of claim 21, further comprising means for triggering the means for wirelessly communicating at a location remote from the communication connector and from the communication cable.

25. A method for connecting a communication cable, comprising:
   engaging a trigger disposed on a cable to wirelessly communicate a control signal to a device having a cable connector; and
   activating a locator signal in response to the control signal to identify the cable connector.

26. The method of claim 25, wherein engaging comprises wirelessly transmitting the control signal from the cable to the device.

27. The method of claim 25, wherein engaging comprises wirelessly transmitting the control signal from a remote device to the device.

28. The method of claim 25, wherein activating the locator signal comprises illuminating a locator light disposed adjacent the cable connector.

29. The method of claim 25, wherein activating the locator signal comprises identifying one of a plurality of user identifiable locators associated with a plurality of cable connectors, respectively.

* * * * *